United States Patent
Klier et al.

(10) Patent No.: US 6,749,256 B1
(45) Date of Patent: Jun. 15, 2004

(54) VEHICLE SEAT HAVING A MOVABLE HEAD RESTRAINT

(75) Inventors: Oliver Klier, Rennertshofen (DE); Christoph Warnken, Ingolstadt (DE)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 10/657,537

(22) Filed: Sep. 8, 2003

(51) Int. Cl.⁷ .......................... B60R 21/055; B60N 2/48
(52) U.S. Cl. ............................ 297/216.12; 297/216.13
(58) Field of Search ................... 297/216.12, 216.13, 297/216.14, 408

(56) References Cited

U.S. PATENT DOCUMENTS

| | | |
|---|---|---|
| 2,869,622 A | 1/1959 | Petersen et al. |
| 3,008,767 A | 11/1961 | Fox |
| 3,397,911 A | 8/1968 | Brosius, Sr. |
| 3,498,670 A | 3/1970 | Finch et al. |
| 3,680,912 A | 8/1972 | Matsuura |
| 4,082,354 A | 4/1978 | Renner et al. |
| 4,190,291 A | 2/1980 | Korger |
| 4,511,180 A | 4/1985 | Klaus |
| 4,626,028 A | 12/1986 | Hatsutta et al. |
| 4,762,367 A | 8/1988 | Denton |
| 4,822,102 A | 4/1989 | Duvenkamp |
| 5,011,225 A | 4/1991 | Nemoto |
| 5,205,585 A | 4/1993 | Reuber et al. |
| 5,378,043 A | 1/1995 | Viano et al. |
| 5,484,189 A | 1/1996 | Patterson |
| 5,664,841 A | 9/1997 | Dal Monte |
| 5,772,280 A | 6/1998 | Massara |
| 5,795,019 A | 8/1998 | Wieclawski |
| 5,823,619 A | 10/1998 | Heilig et al. |
| 5,882,071 A | 3/1999 | Fohl |
| 5,884,968 A | 3/1999 | Massara |
| 5,927,804 A | 7/1999 | Cuevas |
| 5,934,750 A | 8/1999 | Fohl |
| 5,938,279 A | 8/1999 | Schubring et al. |
| 5,961,182 A | 10/1999 | Dellanno |
| 6,017,086 A | 1/2000 | Meyer et al. |
| 6,019,424 A | 2/2000 | Ruckert et al. |
| 6,022,074 A | 2/2000 | Swedenklef |
| 6,024,406 A | 2/2000 | Charras et al. |
| 6,033,018 A | 3/2000 | Fohl |
| 6,082,817 A | 7/2000 | Muller |
| 6,088,640 A | 7/2000 | Breed |
| 6,199,947 B1 * | 3/2001 | Wiklund ................. 297/216.12 |
| 6,213,548 B1 | 4/2001 | Van Wynsberghe et al. |
| 6,250,714 B1 | 6/2001 | Nakano et al. |
| 6,273,511 B1 | 8/2001 | Wieclawski |
| 6,416,125 B1 | 7/2002 | Shah et al. |
| 6,523,892 B1 * | 2/2003 | Kage et al. ............ 297/216.13 |
| 2002/0113483 A1 | 8/2002 | Fischer et al. |

FOREIGN PATENT DOCUMENTS

| | | |
|---|---|---|
| DE | 2 152 202 | 4/1973 |
| DE | 2 152 437 | 4/1973 |
| WO | WO 98/09838 | 3/1998 |
| WO | WO 98/16406 | 4/1998 |

OTHER PUBLICATIONS

U.S. patent application Ser. No. 10/360,391, Farquhar et al., filed Feb. 6, 2003.
J. Latchford and E.C. Chirwa, "Airbag Head Restraint System", Automotive Engrng., Faculty of Technology, Bolton Institute, UK.

* cited by examiner

*Primary Examiner*—Peter R. Brown
(74) *Attorney, Agent, or Firm*—Bill C. Panagos

(57) ABSTRACT

A vehicle seat for use with a vehicle. The vehicle seat includes a seat back having a frame and a moveable head restraint arrangement. A hinge device having a hinge is attached to the frame and is adapted to receive the head restraint arrangement. Upon application of a rearward force, the hinge lengthens vertically and moves the head restraint arrangement from an initial position to a support position.

20 Claims, 3 Drawing Sheets

VEHICLE SEAT HAVING A MOVABLE HEAD RESTRAINT

BACKGROUND OF THE INVENTION

1. Field of the Invention

The present invention relates to a vehicle seat having a moveable head restraint.

2. Background Art

Vehicle seats having moveable headrests or head restraints are known in the vehicle seating art. Examples of such vehicle seats are disclosed in U.S. Pat. No. 4,822,102 and U.S. Pat. No. 4,762,367.

SUMMARY OF THE INVENTION

According to one aspect of the present invention, a vehicle seat for use with a vehicle is provided. The vehicle seat includes a head restraint arrangement having a headrest and a support member. The seat also includes a seat back having a frame. A hinge device is attached to the frame and is adapted to receive the head restraint arrangement. The hinge device includes a hinge positioned within the frame. Upon application of a rearward force, the hinge lengthens vertically and moves the head restraint arrangement from an initial position to a support position.

According to another aspect of the invention, a vehicle seat for use in a vehicle is provided. The vehicle seat includes a head restraint arrangement having a headrest and a support member. The vehicle seat also includes a seat back having a frame. A hinge device may be attached to the frame. The hinge device includes a bracket arrangement having first and second slots. A hinge is pivotally connected to the bracket arrangement at a first end and connected to the first slot at a second end. A linking member adapted to receive the head restraint arrangement is connected to the first and second slots. Upon application of a rearward force, the hinge lengthens vertically and is configured to move the head restraint arrangement from an initial position to a support position.

According to another aspect of the invention, a vehicle seat for use in a motor vehicle is provided. The vehicle seat includes a head restraint arrangement having a headrest and a support member as well as a seat back having a frame. A hinge device is attached to the frame. The hinge device includes a bracket arrangement, a hinge, a linking member, a connecting plate, and a lock mechanism. The bracket arrangement includes first and second slots. The hinge includes first and second hinge portions connected together by a connecting member. The first hinge portion is pivotally connected to the bracket arrangement and the second hinge portion is slidably connected to the first slot of the bracket arrangement. The linking member is connected to the second hinge portion by a first shaft and is slidably connected to the second slot by a second shaft. The connecting plate is connected to the first and second shafts and to a sleeve that receives the head restraint arrangement. The lock mechanism is configured to selectively lock the head restraint arrangement in one of multiple support positions. The lock mechanism includes a fixed locking element disposed on the bracket arrangement and a moveable locking element disposed on the second shaft. Upon application of a rearward force, the hinge lengthens vertically and operates with the linking member and bracket arrangement to move the head restraint arrangement from an initial position to a support position.

The first and second hinge portions of the hinge may define an angle of less than 180° when the head restraint arrangement is in the initial position. Upon application of a rearward force, the first and second hinge portions are configured to move such that the angle increases.

A portion of the second slot may extend in a different direction from the first slot. The first and second slots are configured to receive first and second shafts, respectively. The linking member may be connected to a connecting plate that is attached to a sleeve that receives the support member.

An impact target may engage the connecting member to move the head restraint arrangement from the initial position to the support position. The impact target may include an upper portion and a lower portion. The upper portion may be located above and be connected to the lower portion. The upper portion may be configured to engage the connecting member.

The vehicle seat may include a lock mechanism having first and second locking elements that are engagable with each other. The first and second locking elements are configured to allow movement of the head restraint arrangement toward the support position while inhibiting movement toward the initial position. The first locking element may be integrally formed with the bracket arrangement and the second locking element may be attached to a shaft disposed in the second slot. The lock mechanism may include a spring that engages the second locking element to urge the second locking element into engagement with the first locking element. The spring may be attached to the connecting plate and contact the second locking element by a side opposite the first locking element.

DETAILED DESCRIPTION OF THE PREFERRED EMBODIMENT(S)

Figures 1, 2:
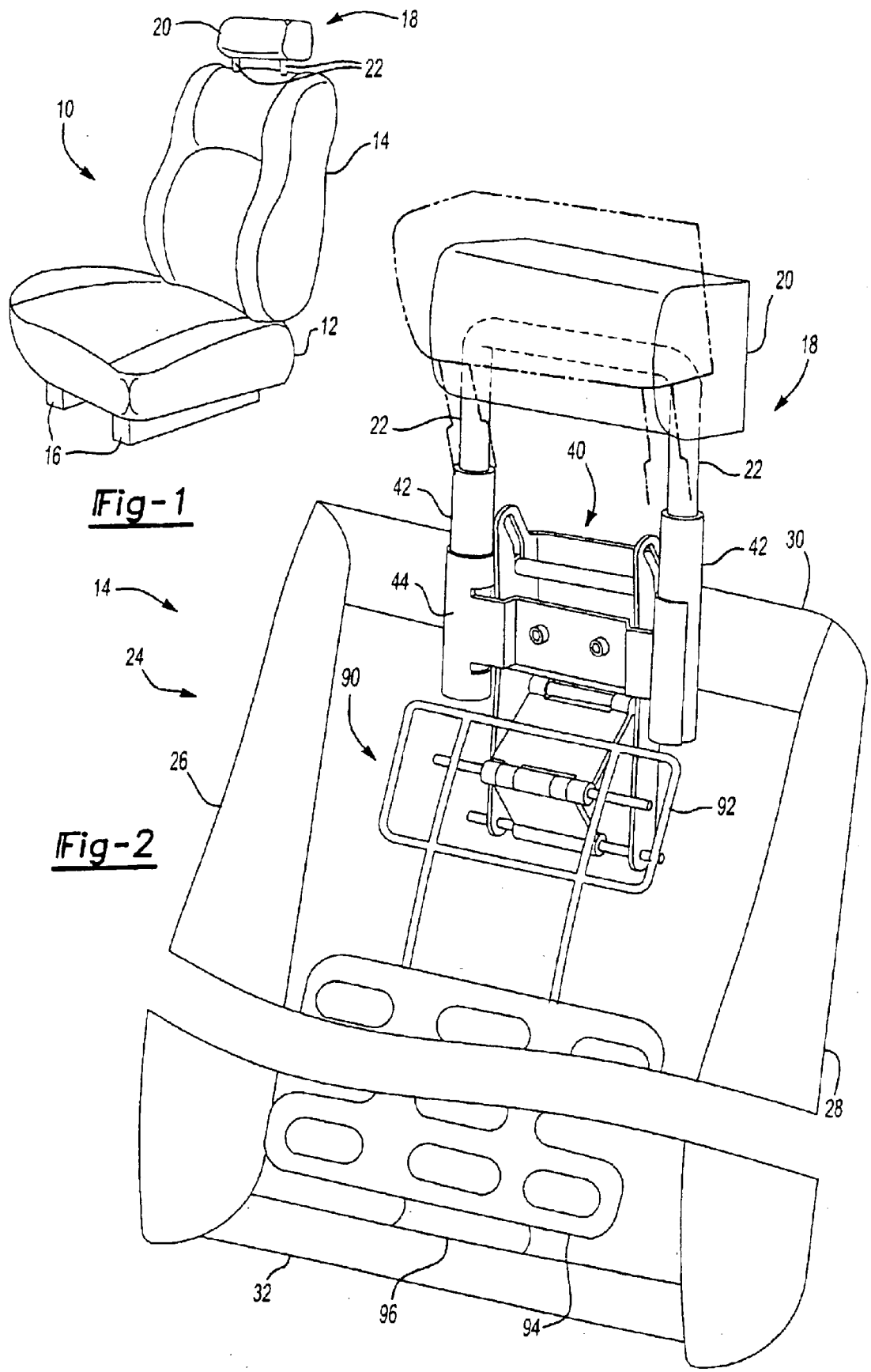
FIG. 1 is a perspective view of a vehicle seat.
FIG. 2 is a schematic view of the vehicle seat with a head restraint arrangement in an initial position.

FIG. 1 shows a vehicle seat assembly 10 having a seat bottom 12 and a seat back 14. The seat bottom 12 may be attached to a vehicle floor and/or to seat adjuster mechanisms 16 that enable lateral and/or vertical movement of the seat bottom 12 with respect to the vehicle floor. The seat bottom 12 and the seat back 14 may be pivotally connected by a pivot mechanism (not shown) that allows the seat back 14 to pivot with respect to the seat bottom 12. Two pivot mechanisms may be disposed on opposite sides of the seat assembly 10 to facilitate pivoting of the seat back 14. The seat back 14 includes a moveable head restraint arrangement 18. The head restraint arrangement 18 includes a head restraint or headrest 20 and at least one headrest support 22. The head restraint arrangement 18 is movably associated with the seat back 14 as explained below in detail.

Referring to FIG. 2, the seat back 14 is shown in greater detail. The seat back 14 includes a seat back frame 24 having any suitable configuration. In the embodiment shown in FIG. 2, the seat back frame 24 includes first and second side portions such as first and second side supports 26 and 28, respectively. The seat back frame 24 also includes upper and lower laterally extending portions such as upper and lower cross members 30 and 32, respectively. The side supports 26, 28 and cross members 30, 32 may be formed as separate components that are joined together in any suitable manner, such as by welding. Alternatively, two or more of the portions 26, 28, 30, and 32 may be integrally formed.

A hinge device 40 is connected to the seat back frame 24 in any suitable manner, such as with fasteners or by welding. As explained below in greater detail, the hinge device 40 allows movement of the head restraint arrangement 18 with respect to the seat back frame 24 from a normal use position or initial position, shown in FIG. 2, toward a fully actuated position or support position shown in phantom in FIG. 2.

Figure 3:
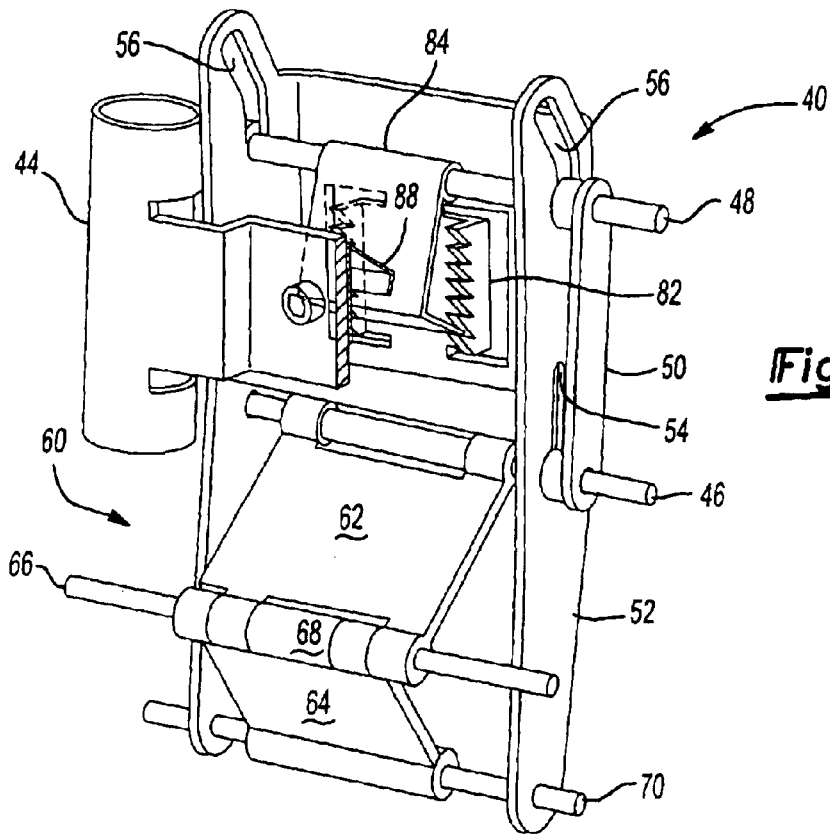
FIG. 3 is a fragmentary perspective view of a hinge device of the vehicle seat in the initial position.

Referring to FIGS. 2 and 3, the hinge device 40 includes two sleeves 42. The headrest supports 22 are slidably disposed in the sleeves 42 such that the headrest 20 may be adjusted vertically with respect to the seat back frame 24 and independently of actuation of the head restraint arrangement 18.

The sleeves 42 are connected to a connecting member, such as a connecting plate 44. The connecting plate 44 may have any suitable arrangement and may be formed as a single piece by any suitable process, such as stamping. The sleeves 42 and connecting plate 44 may be connected together by any suitable means, such as by fasteners, adhesives, or welding.

Referring to FIG. 3, the connecting plate 44 may be attached to a first shaft 46, a second shaft 48, and/or a linking member 50. The first shaft 46 and second shaft 48 are shown extending laterally through slots in a bracket arrangement 52. Specifically, the first shaft 46 extends through two lower slots 54 and the second shaft 48 extends through two upper slots 56 in the bracket arrangement 52. The upper slot 56, or a portion thereof, may extend in a different direction than the lower slot 54. For example, the upper slot may be angled or curved. Alternately, the lower and upper slots 54, 56 may extend in the same direction.

The first and second shafts 46, 48 are connected by two linking members 50. The linking members 50 allow the first shaft 46 and second shaft 48 to move in unison. The first and second shafts 46, 48 may be secured to the linking member 50 and/or connecting plate 44 by any suitable means, such as with a snap ring, cotter pin, or fastener.

The bracket arrangement 52 has first and second portions and any suitable configuration such that the hinge is pivotally connected to the first portion and slidably connected to the second portion. In the embodiment shown in FIG. 3, the bracket arrangement 52 is configured such that the first and second portions are formed as a single component. However, the bracket arrangement 52 could be integrated into another component, such as the seatback frame 24. Alternately, the portions of the bracket arrangement 52 could be disposed on or formed in different components. For example, the second portion could be part of the seatback frame 24 and the first portion could be another component, such as a bracket attached to the seatback frame 24.

A hinge 60 is connected to the first shaft 46. The hinge 60 includes an upper hinge portion 62 and a lower hinge portion 64 that are pivotally connected by a connecting member 66. Optionally, a spacer 68 may be disposed around the connecting member 66 between sections of the upper and lower hinge portions 62, 64. As shown in FIG. 3, the connecting member 66 may extend axially beyond the sides of the hinge 60 and the bracket arrangement 52. In addition, the connecting member 66 may be secured to the hinge 60 by any suitable means, such as with a nut, snap ring, or cotter pin.

The upper hinge portion 62 is connected to the bracket arrangement 52 by the second shaft 46. The lower hinge portion 64 is connected to the bracket arrangement 52 by a third shaft 70. The third shaft 70 extends through two apertures in the bracket arrangement 52 and allows the lower hinge portion 64 to pivot.

The hinge device 40 may include a lock mechanism 80. The lock mechanism 80 allows movement of the head restraint arrangement 18 toward the support position while inhibiting movement of the head restraint arrangement 18 toward the initial position. The lock mechanism 80 may have any suitable configuration and may lock the head restraint arrangement 18 in one or more positions disposed away from the initial position. For instance, the lock mechanism may be configured as a friction-type lock mechanism.

Figure 5:
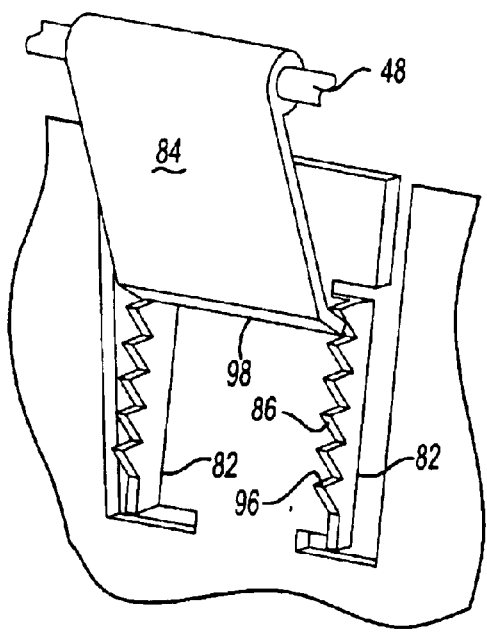
FIG. 5 is an enlarged perspective view of a lock mechanism of the hinge device shown in FIG. 3.
Figure 6:
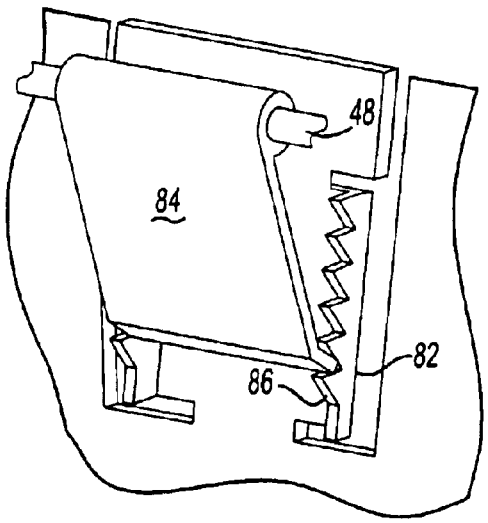
FIG. 6 is an enlarged perspective view of the lock mechanism of the hinge device shown in FIG. 4.
Figure 7:
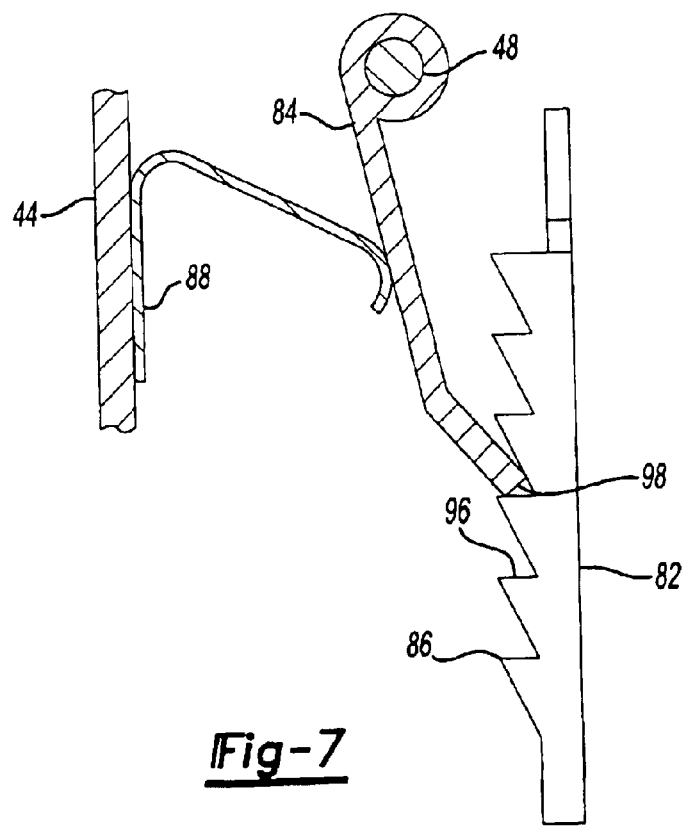
FIG. 7 is a section view of the lock mechanism in an intermediate position.

A close up of the lock mechanism 80 depicted in FIG. 3 is shown in more detail in FIGS. 5 and 6. In the embodiment shown in FIG. 3, the lock mechanism 80 includes a first locking element 82, such as ratchet member attached to or integrally formed with the bracket arrangement 52. A second locking element 84 is disposed on the second shaft 48 and is configured to cooperate with the first locking element 82. The first locking element 82 may include multiple projections, such as teeth 86. The second locking element 84 is selectively engageable with the teeth 86 of the first locking element 82.

A spring 88 may engage the second locking element 84 to urge the second locking element 84 into engagement with the first locking element 82. As shown in FIG. 3, the spring 88 may be disposed on the connecting plate 44. The spring 88 may have any suitable configuration that provides a biasing force on the second locking element 84.

The hinge device 40 may be associated with an impact target 90 having any suitable configuration. In the embodiment shown in FIG. 2, the impact target 90 includes an upper portion 92 positioned to engage an upper back and a lower portion 94. The upper portion 92 may be a wire configured to extend laterally between portions of the seat back frame 24 to provide lumber support. The upper portion 92 is connected to the lower portion 94 by any suitable means, such as with fasteners or by welding. The lower portion 94 may be configured as a plate positioned to engage the pelvic region and/or back of a vehicle occupant. The lower portion 94 may be moveably connected to the seat back frame 24 by any suitable means. For example, in the embodiment shown in FIG. 2, the lower portion 94 is connected to the lower cross member 32 by a moveable link 96. As explained below in detail, a sufficient rearward force acting upon the impact target 90 causes movement of the head restraint arrangement 18.

Referring to FIGS. 3–7, operation of the vehicle seat 10 will now be described in more detail. Sufficient rearward loading on the impact target 90 by a seat occupant such as during a rear crash event causes the head restraint arrangement 18 to pivot with respect to the seat back frame 24. Specifically, sufficient rearward loading on one or both of the upper and lower portions 92, 94 causes the hinge device 40 to actuate. In one embodiment of the invention, portions 92 and 94 are configured such that the pelvis engages the lower portion 94 first to initiate movement of the headrest. Then the back of a seat occupant engages the upper portion 92. Such a configuration results in quicker movement of the headrest to the support position while minimizing deflection of the backrest.

In the embodiment shown in FIG. 2, the impact target 90 contacts the connecting member 66. Alternately, rearward loading may act on the hinge 60 where the upper and lower hinge portions 62, 64 meet or on axially extending portions of the connecting member 66 without the need for an impact target.

Figure 4:
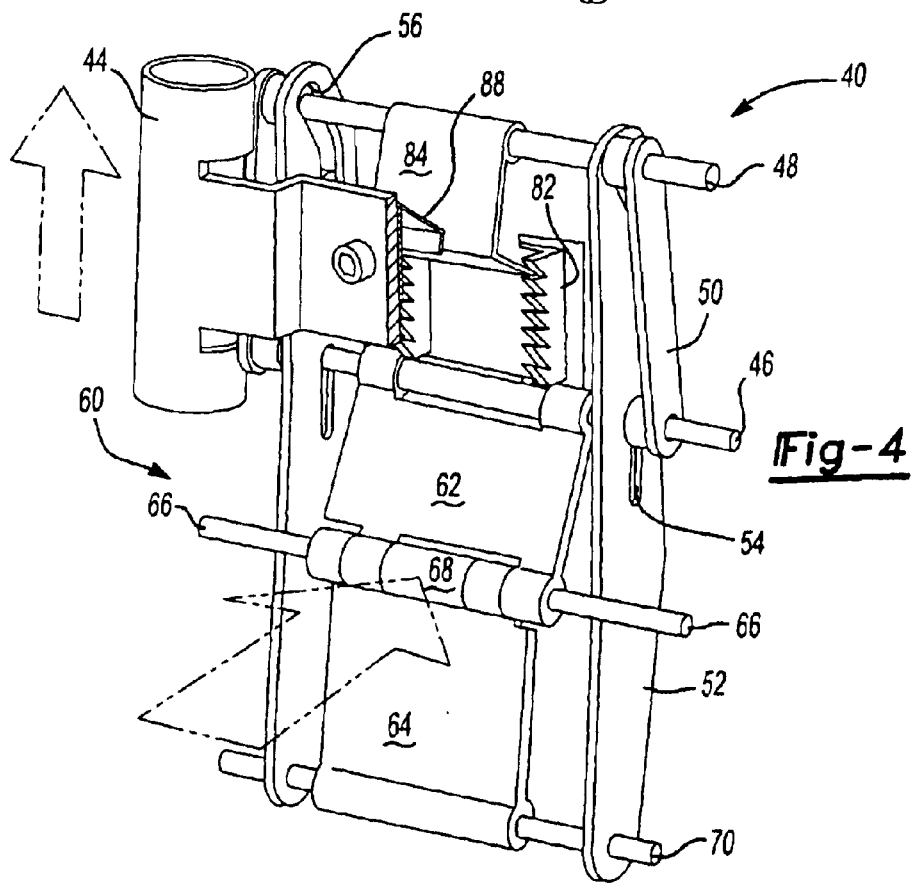
FIG. 4 is a fragmentary perspective view of the hinge device of the vehicle seat in a fully actuated position.

Movement of the impact target 90 causes the hinge 60 to move from a folded position shown in FIG. 3 toward an extended position as shown in FIG. 4. As the hinge 60 collapses, the upper hinge portion 62 moves upward. As the upper hinge portion 62 moves upward, the first shaft 46 slides upward in the lower slots 54. The second shaft 48 translates upward along the upper slot 56 since the first and second shafts 46, 48 are connected by the linking members 50. Movement of the first shaft 46, second shaft 48, and linking member 50 causes the connecting plate 44, sleeves 42, and head restraint arrangement 18 to move. In the embodiment shown in FIGS. 3 and 4, the angled shape of the upper slot 56 directs the head restraint arrangement 18 upward and forward. As a result, the headrest 20 moves from an initial position to a fully actuated position or support position for providing support to the head of an occupant.

Referring to FIGS. 4 and 5, as the hinge 60 collapses, the second locking element 84 moves upwardly and into engagement with the first locking element 82. In the embodiment shown in FIGS. 4 and 5, for example, the teeth 86 of the first locking element 82 are sloped to allow upward travel of the head restraint arrangement 18 while inhibiting downward movement. Each tooth 86 includes a flat edge 96 that is engageable with a surface 98 of the second locking element 84 to inhibit downward travel of the head restraint arrangement 18. The spring 88 urges the second locking element 84 into engagement with the first locking element 82 while also allowing lateral movement of the second locking element 84 to permit upward movement of the second locking element 82.

The configuration of the first and second locking elements 82, 84 allows movement of the head restraint arrangement 18 toward the support position while inhibiting movement toward the initial position and inhibits back driving of the headrest 20 due to rearward loading from the head of a seat occupant. In addition, locking elements 82 and 84 may cooperate to lock the head restraint arrangement 18 in any one of multiple intermediate support positions between the initial position and the support position depending on the degree of rearward loading on the impact target mechanism 90 and/or hinge 60. As a result, back driving of the headrest 20 may also be inhibited at any of the intermediate support positions.

The vehicle seat 10 may also include a release device (not shown) for disengaging the locking elements 82 and 84 to allow movement of the head restraint arrangement 18 toward the initial position. For example, the lock mechanism may include a release lever attached to the second locking element 84 and/or spring 88. The release lever may be positioned so that it is accessible for manual actuation. When the release lever is actuated, the second locking element 84 is disengaged from the first locking element 82 to allow downward movement of the head restraint arrangement 18. Alternatively, the vehicle seat 10 may be provided with any suitable release device for disengaging the first and second locking elements 82 and 84. For example, the vehicle seat 10 may include a cable connected to the second locking element 84 and/or spring 88 and a release lever connected to the cable for moving the cable to move the second locking element 84 away from the first locking element 82.

In addition, the vehicle seat 10 may include one or more biasing members operatively associated with the seat back frame 24 and the impact target 90 or hinge device 40 for urging the head restraint arrangement 18 toward the initial position. For example, the vehicle seat 10 may include return springs connected between the lower cross member 32 and the lower portion 94 of the impact target 90 that bias the impact target 90 and head restraint arrangement 18 toward the initial position. Furthermore, the vehicle seat 10 may be configured such that the head restraint arrangement 18 is moveable in the above described manner without requiring loading on the impact target 90. For example, the headrest 20 may be provided with sufficient mass such that as a result of sufficient impact to the vehicle (e.g., a front crash event), inertia of the headrest 20 causes the head restraint arrangement 18 to move with respect to the seat back frame 24.

Alternately or supplementally, the impact target 90 may be configured to bias the head restraint arrangement 18 toward the initial position. For example, the lower impact target 92 may be formed from memory retention material such as flexible plastic so that the impact target 90 moves toward or returns to the an initial configuration when the lock mechanism 80 is released and rearward loading on the impact target mechanism is removed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat for use with a vehicle, the vehicle seat comprising:
    a head restraint arrangement having a headrest and a support member;
    a seatback having a frame and a bracket arrangement attached to the frame; and
    a hinge device attached to the frame and the head restraint arrangement, the hinge device including a hinge having a first hinge portion pivotally connected to the bracket arrangement and a second hinge portion slidably connected to the bracket arrangement;
    wherein upon application of a rearward force on the hinge, the hinge lengthens upwardly and moves the head restraint arrangement from an initial position to a support position.

2. The vehicle seat of claim 1 wherein the hinge includes first and second hinge portions are pivotally connected together by a connecting member.

3. The vehicle seat of claim 2 wherein the hinge device further comprises a bracket arrangement having a first slot configured to receive a first shaft, the first shaft slidably connecting the first hinge portion and the bracket arrangement.

4. The vehicle seat of claim 3 wherein the bracket arrangement further comprises a second slot configured to receive a second shaft, the second shaft slidably connecting a linking member and the bracket arrangement, the linking member being operative to couple the first and second shafts.

5. The vehicle seat of claim 4 wherein a portion of the second slot extends in a different direction from the first slot.

6. The vehicle seat of claim 2 further comprising an impact target that engages the connecting member to move the head restraint arrangement from the initial position to the support position.

7. The vehicle seat of claim 6 wherein the impact target includes an upper portion and a lower portion, the upper portion located above and connected to the lower portion and configured to engage the connecting member.

8. The vehicle seat of claim 1 further comprising a lock mechanism that includes a first locking element and a second locking element engageable with the first locking element, wherein the first and second locking elements are configured to allow movement of the head restraint arrangement toward the support position while inhibiting movement toward the initial position.

9. The vehicle seat of claim 8 wherein the lock mechanism further comprises a spring that engages the second locking element to urge the second locking element into engagement with the first locking element.

10. The vehicle seat of claim 8 wherein the second locking element is disposed on the second shaft.

11. A vehicle seat for use with a vehicle, the vehicle seat comprising:
   a head restraint arrangement having a headrest and a support member;
   a seatback having a frame; and
   a hinge device including:
      a bracket arrangement attached to the frame, the bracket arrangement having first and second slots;
      a hinge pivotally connected to the bracket arrangement at a first end and moveably coupled to the first slot at a second end; and
      a linking member moveably coupled to the first and second slots and adapted to receive the head restraint arrangement;
      wherein upon application of a rearward force the hinge lengthens vertically and is configured to move the head restraint arrangement from an initial position to a support position.

12. The vehicle seat of claim 11 wherein the linking member is connected to a connecting plate that is attached to a sleeve that receives the support member of the head restraint arrangement.

13. The vehicle seat of claim 11 wherein the hinge includes first and second hinge portions connected together by a connecting member, wherein the first and second hinge portions define an angle of less than 180 degrees when the head restraint arrangement is in the initial position and wherein upon application of a rearward force the first and second hinge portions are configured to move such that the angle increases.

14. The vehicle seat of claim 11 further comprising an impact target that engages the hinge to move the head restraint arrangement from the initial position to the support position.

15. The vehicle seat of claim 11 further comprising a lock mechanism that includes a first locking element and a second locking element engageable with the first locking element, wherein the first and second locking elements are configured to allow movement of the head restraint arrangement toward the support position while inhibiting movement toward the initial position.

16. The vehicle seat of claim 15 wherein the first locking element is integrally formed with the bracket arrangement and the second locking element is attached to a shaft disposed in the second slot.

17. The vehicle seat of claim 15 wherein the lock mechanism is configured to selectively lock the head restraint arrangement in one of multiple support positions.

18. The vehicle seat of claim 15 wherein a spring that engages the second locking element to urge the second locking element into engagement with the first locking element.

19. The vehicle seat of claim 18 wherein the spring is attached to the connecting plate and contacts the second locking element on a side opposite the first locking element.

20. A vehicle seat for use in a motor vehicle, the vehicle seat comprising:
   a head restraint arrangement having a headrest and a support member;
   a seatback having a frame, the frame having first and second side portions and an upper member disposed between the side portions; and
   a hinge device disposed proximate to the upper member, the hinge device including:
      a bracket arrangement having first and second slots;
      a hinge having a first hinge portion pivotally connected to the bracket arrangement and a second hinge portion connected to the first hinge portion by a connecting member and connected to the first slot of the bracket arrangement;
      a linking member connected to the second hinge portion by a first shaft and connected to the second slot by a second shaft;
      a connecting plate connected to the first and second shafts and connected to a sleeve adapted to receive the head restraint arrangement; and
      a lock mechanism configured to selectively lock the head restraint arrangement in one of multiple support positions, the lock mechanism including a fixed locking element disposed on the bracket arrangement and a movable locking element disposed on the second shaft;
   wherein upon application of a rearward force the hinge lengthens vertically and operates with the linking member to move the head restraint arrangement from an initial position to a support position.

* * * * *